United States Patent [19]

Sitko

[11] 4,415,146

[45] Nov. 15, 1983

[54] SUSPENSION STRUT ASSEMBLY

[76] Inventor: James R. Sitko, 5431 Vandewater, Waterford, Mich. 48095

[21] Appl. No.: 411,619

[22] Filed: Aug. 26, 1982

Related U.S. Application Data

[63] Continuation of Ser. No. 231,265, Feb. 3, 1981, abandoned.

[51] Int. Cl.³ .............................................. F16F 3/10
[52] U.S. Cl. .................................. 267/9 C; 267/22 R
[58] Field of Search .............. 188/129; 267/8 R, 9 C, 267/9 R, 9 B, 22 R, 33, 63 R; 280/668, 696–698

[56] References Cited

U.S. PATENT DOCUMENTS

| | | |
|---|---|---|
| Re. 20,030 | 7/1936 | Ledwinka . |
| 769,841 | 9/1904 | Shepard . |
| 1,510,017 | 9/1924 | Schmidt . |
| 2,381,404 | 8/1945 | Cottrell . |
| 2,490,738 | 12/1949 | Lehrman . |
| 2,497,829 | 2/1950 | Baselt . |
| 2,516,072 | 7/1950 | Piron . |
| 2,534,419 | 12/1950 | Dath . |
| 2,549,036 | 4/1951 | Withall . |
| 2,552,668 | 5/1951 | Dath . |
| 2,614,831 | 10/1952 | Withall . |
| 2,752,149 | 6/1956 | Forcellini . |
| 2,767,858 | 10/1956 | Fillion . |
| 2,814,392 | 11/1957 | Campbell . |
| 2,819,060 | 6/1958 | Neidhart . |
| 2,841,292 | 7/1958 | Campbell . |
| 3,039,757 | 6/1962 | Barr . |
| 3,161,420 | 12/1964 | Rix . |
| 3,178,036 | 4/1965 | Cardwell . |
| 3,332,523 | 7/1967 | Chambers ........................ 188/129 |
| 3,372,947 | 3/1968 | Doennecke . |
| 3,402,924 | 9/1968 | Rix . |
| 3,409,284 | 11/1968 | Rix . |
| 3,417,986 | 12/1968 | Fuke . |
| 3,434,708 | 3/1969 | Hawk . |
| 3,480,268 | 11/1969 | Fishbaugh . |
| 3,537,696 | 11/1970 | Webster . |
| 3,640,545 | 2/1972 | Citroen . |
| 3,677,535 | 7/1972 | Beck . |
| 3,713,516 | 1/1973 | Freyler . |
| 3,762,694 | 10/1973 | MacDonnell . |
| 3,820,634 | 6/1974 | Poe . |
| 4,010,940 | 3/1977 | Freyler ............................ 267/9 B |
| 4,010,940 | 3/1977 | Freyler . |
| 4,032,125 | 6/1977 | Minakawa et al. . |
| 4,089,511 | 5/1978 | Palmer . |
| 4,105,222 | 8/1978 | Buchwald . |
| 4,106,596 | 8/1978 | Hausmann . |
| 4,140,304 | 2/1979 | Ghrist . |
| 4,271,922 | 6/1981 | Kishline . |

FOREIGN PATENT DOCUMENTS

| | | |
|---|---|---|
| 2553890 | 6/1977 | Fed. Rep. of Germany . |
| 1475242 | 2/1967 | France ............................ 267/22 R |
| 709080 | 5/1954 | United Kingdom . |
| 771392 | 4/1957 | United Kingdom . |
| 832878 | 4/1960 | United Kingdom . |
| 1489473 | 10/1977 | United Kingdom . |
| 1238641 | 7/1981 | United Kingdom . |

OTHER PUBLICATIONS

Technical Paper No. 730270, *Rubber Springs*, W. G. Chalmers, Chalmers Suspensions International Ltd.
Section 2, *Suspension and Steering*, From VW Service Manual for Rabbits and Sciroccos.
*New Shock Absorbers*, E. Jacobs, Popular Science, Jun. 1979.

*Primary Examiner*—Duane A. Reger
*Attorney, Agent, or Firm*—Finnegan, Henderson, Farabow, Garrett & Dunner

[57] ABSTRACT

An improved suspension strut (10, 134, 178) for use in motor vehicle suspension systems is disclosed which integrates serially connected variable and fixed rate spring means (84, 104) with friction damping means (108). The use of variable rate spring means enables the suspension strut to be designed so as to provide a vehicle ride frequency which more closely approaches the desired optimum ride frequency for the particular vehicle over substantially the entire load range of the vehicle.

24 Claims, 8 Drawing Figures

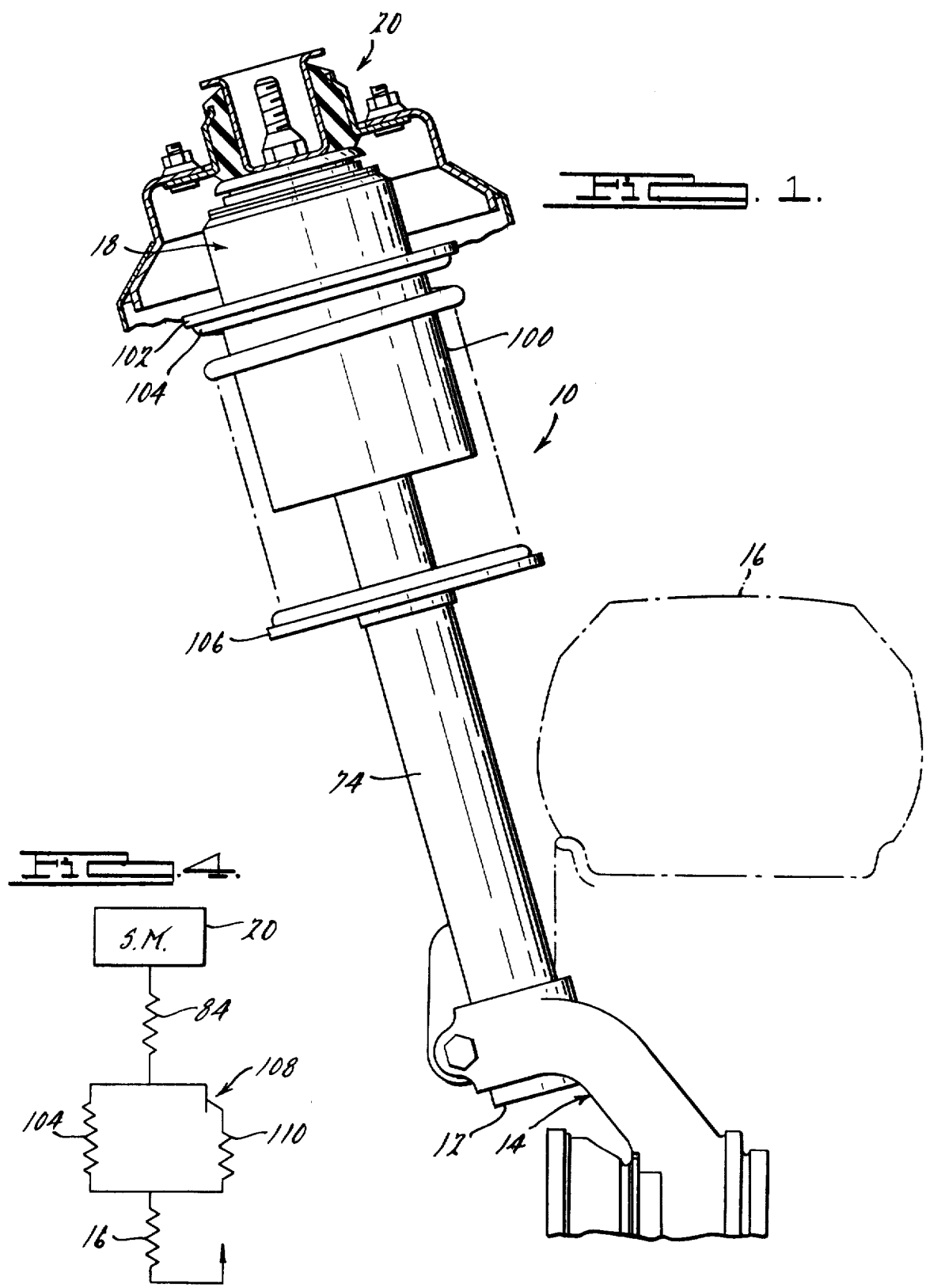

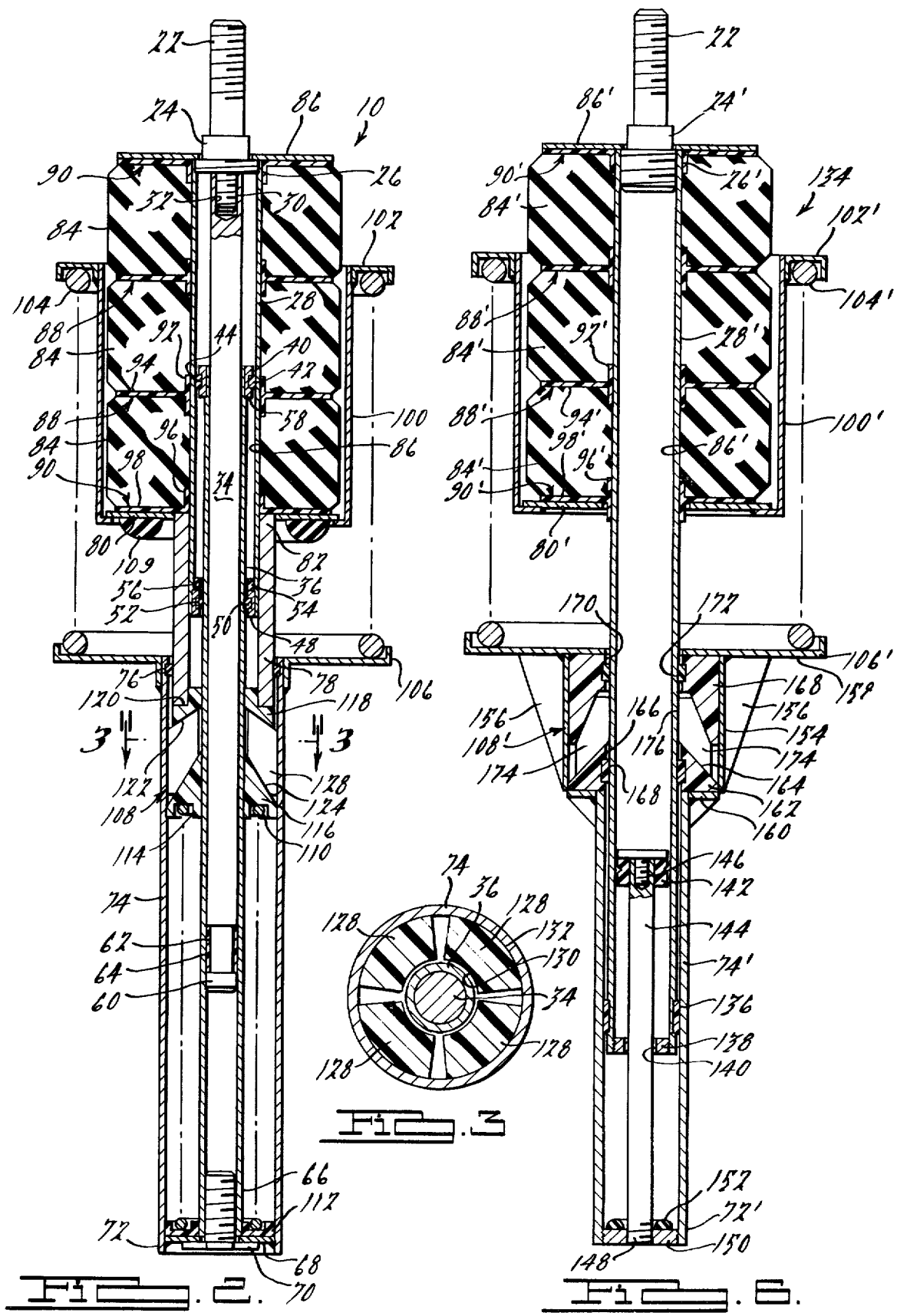

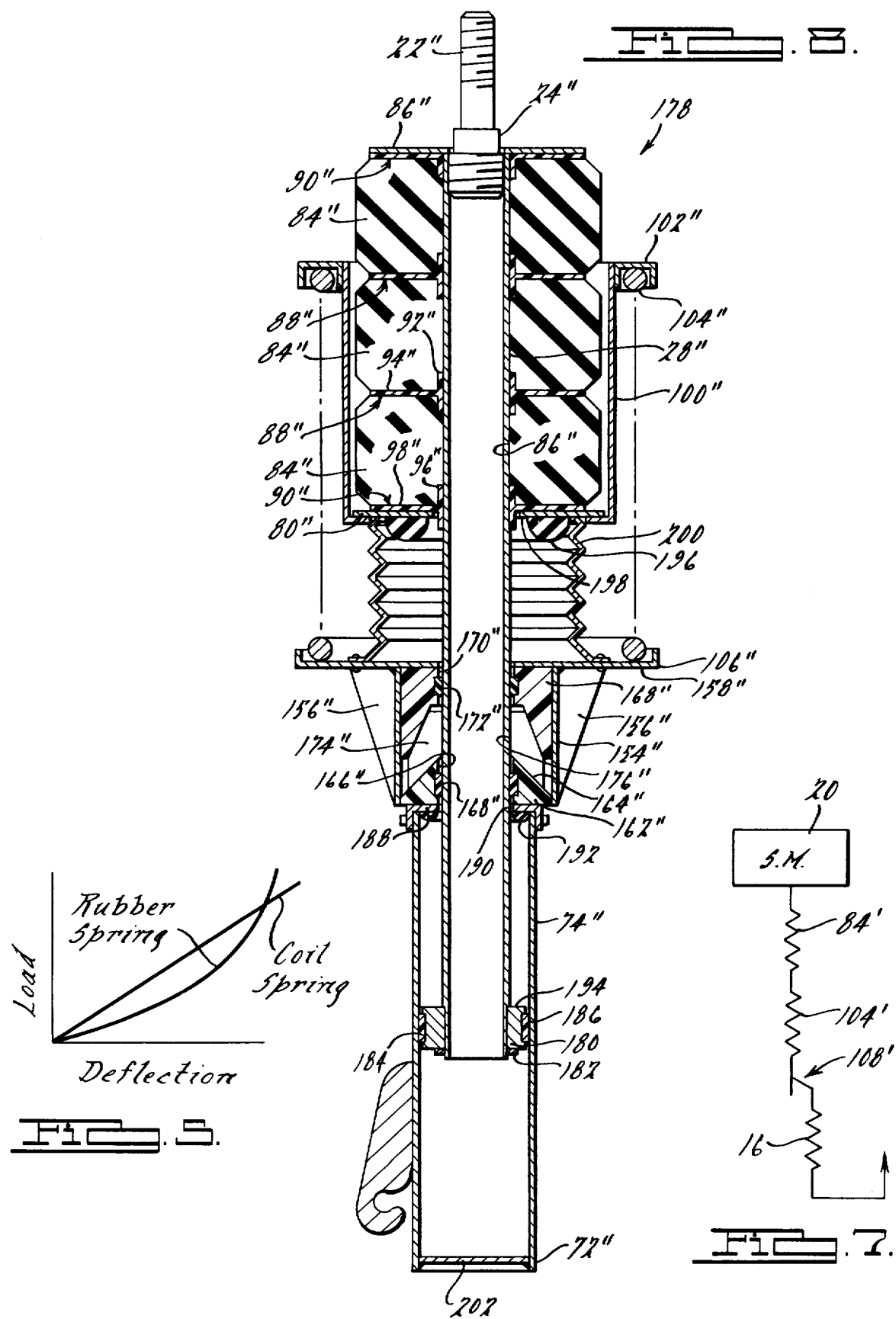

SUSPENSION STRUT ASSEMBLY

This is a continuation of application Ser. No. 231,265, filed Feb. 3, 1981, now abandoned.

BACKGROUND AND SUMMARY OF THE INVENTION

The present invention relates to suspension strut assemblies for use in vehicle suspension systems and more particularly to such struts which incorporate fixed and variable rate spring means in combination with friction damping apparatus.

Strut type suspension systems are being incorporated into more and more of our present day motor vehicles in order to accommodate the demands for lighter more compact fuel efficient vehicles. One of the more common of these strut suspensions utilize a MacPherson type strut which incorporates conventional constant rate helical coil springs in conjunction with hydraulic type shock damping means.

Such struts have many disadvantages associated therewith in spite of their compactness and relative weight savings over prior conventional suspension systems such as for example high replacement costs, numerous seals for the hydraulic damping arrangement, binding or sticking of internal bearings, etc. Additionally, because these struts employ substantially constant rate helical coil springs, vehicle ride frequency, which is a function of both mass and spring rate, may only be optimized for one particular load condition. Thus, at any other load condition the ride frequency must be compromised and less than optimum. This comprise is becoming increasingly more significant as the total weight of vehicles is decreased. While previously a conventional passenger car may have weighed approximately four to five thousand pounds, present day vehicles are more likely to fall within a range of two to three thousand pounds. Thus, whereas with the prior heavier vehicles the difference between operating the vehicle lightly loaded such as with only the driver versus heavily loaded such as with four to six people plus luggage or the like may have represented a relatively small percentage increase in load on the suspension system, the same difference in loading represents a substantially more significant percentage increase in loading for the present day lighter weight vehicles. Hence, the load range of present day vehicles as a function of vehicle weight has increased significantly. Because the ride frequency is a function of both the spring rate and the sprung mass, it is substantially more difficult, if not impossible, to provide a comfortable vehicle ride at both light load levels and full load levels in today's lighter weight vehicles particularly with conventional coil spring suspension systems.

Accordingly, the present invention provides an improved suspension strut assembly particularly well suited for use in conjunction with such lighter weight fuel efficient motor vehicles which provides both variable and fixed rate spring means whereby the optimum vehicle ride frequency may be more closely approximated over a substantially greater range of vehicle loading from relatively light loading to substantially full vehicle loading. Additionally, the improved strut assembly of the present invention utilizes a friction damping arrangement which reduces the number of parts required for the assembly as well as offering improved reliability due to the elimination of numerous hydraulic seals required in conventional damping systems. Further, not only does the use of a friction damping system offer substantial cost savings by requiring fabrication and assembly of fewer parts but also the need for high tolerance machining operations necessary to provide the metered fluid flow ports and the like in hydraulic damping arrangements is also reduced thereby affording additional cost savings.

Additional advantages and features of the present invention will become apparent from the subsequent description and the appended claims taken in conjunction with the accompanying drawings.

BRIEF DESCRIPTION OF THE DRAWINGS

FIG. 1 is a fragmentary elevational view of a suspension strut assembly in accordance with the present invention shown in operative relationship to a portion of a front wheel suspension system for a motor vehicle;

FIG. 2 is a sectioned view of the suspension strut assembly shown in FIG. 1, the section being taken along a radial plane extending along the longitudinal axis thereof;

FIG. 3 is a section view of the friction damping assembly incorporated in the strut assembly of the present invention, the section being taken along the line 3—3 of FIG. 2;

FIG. 4 is a schematic diagram of the strut assembly of FIGS. 1-3 showing the operative relationship of the spring biasing means incorporated therein;

FIG. 5 is a graph showing a representative plot of load versus deflection for both coil springs and rubber springs;

FIG. 6 is a view similar to that of FIG. 2 but showing another embodiment of the present invention;

FIG. 7 is a view similar to that of FIG. 4 but illustrating the operative relationship of the springs for the embodiment of FIG. 6; and FIG. 8 is a view similar to that of FIG. 6 but showing yet another embodiment of the present invention.

DESCRIPTION OF THE PREFERRED EMBODIMENTS

Referring now to the drawings and in particular to FIGS. 1 through 3, there is illustrated a portion of the suspension system for supporting the front or steering wheel of a motor vehicle and which illustrates an improved suspension strut 10 in accordance with the present invention having one end 12 thereof secured to the steering knuckle 14 of the vehicle which in turn rotatably supports a vehicle wheel 16. The upper end 18 of the strut is secured to a suitable mounting assembly 20 associated with the vehicle body assembly. As shown both the steering knuckle attachment arrangement and the body mounting assembly are of conventional design and typical of suspension systems designed to accommodate strut suspensions of the MacPherson type.

As best seen with reference to FIG. 2, strut 10 has a threaded strud 22 provided at the upper end thereof which is adapted for securing the strut to mounting assembly 20 of the motor vehicle body. The lower end of stud 22 is provided with an enlarged diameter collar portion 24 adapted to threadably engage one end 26 of an elongated hollow tubular member 28 of generally cylindrical cross sectional shape. A second threaded projection 30 extends downwardly from collar portion 24 and into a threaded bore 32 provided in the upper end of an elongated cylindrical guide rod member 34 which is positioned substantially coaxially within hollow tubular member 28.

A second elongated hollow tubular member 36 of generally cylindrical cross sectional shape is also provided being axially movably telescopically received between rod member 34 and upper tubular member 28. The upper end of this second tubular member 36 has a bearing assembly fitted thereon comprising an annular ring 40 having a suitable low friction bearing 42 seated within a radially outwardly opening groove 44 provided thereon. Similarly, the lower end of tubular member 28 also has a bearing assembly fitted thereon comprising an annular ring 48 having a suitable low friction bearing 50 seated within a radially inwardly facing groove 52 provided thereon. The outer sidewall surface of tubular member 36 and the inner sidewall surface of tubular member 28 will each be suitably polished so as to provide a smooth low friction surface for sliding engagement by bearings 50 and 42 respectively which will operate to support and guide sliding telescopic movement between tubular members 28 and 36. Annular rings 40 and 48 may be secured to respective tubular members 36 and 28 in any suitable manner such as by threading, welding, or by use of a suitable fastener such as a snap ring or the like. Preferably bearings 42 and 50 will both be fabricated from a suitable polymeric composition such as for example a filled teflon material such as Rulon available from Dixon Corporation, Bristol, R.I.

A rebound pad 54 preferably of rubber is also provided seated on the upper surface 56 of the lower bearing assembly which is adapted to provide a cushioned stop engageable with lower surface 58 of ring 40 of the upper bearing assembly so as to limit the maximum extension of strut 10 and to prevent complete withdrawal of tubular member 36 from within tubular member 28.

The lower end 60 of guide rod member 34 is provided with an axially elongated groove 62 within which an annular bearing member 64 is fitted. The inner sidewall surface of tubular member 36 will preferably also be suitably honed and polished so as to provide a smooth surface for sliding engagement with bearing member 64. Preferably, bearing member 64 will also be fabricated from a suitable low friction, long wearing polymeric composition such as for example Rulon.

The lower end 66 of tubular member 36 is fixedly secured to an end plate 68 by means of a suitable threaded fastener such as bolt 70. End plate 68 is in turn secured to and closes off one end 72 of another elongated hollow tubular member 74 which also extends in substantially coaxial relationship therewith. A suitable low friction, long wearing polymeric composition bearing 76 is also provided being seated with an annular groove provided adjacent the upper end of tubular member 74 which slidingly engages the outer sidewall of elongated hollow tubular member 78 which is also telescopically received within tubular member 74 and which telescopically receives the lower end of tubular member 28 extending thereinto from the upper end thereof.

An annular flange member 80 is secured to the upper end 82 of tubular member 78 which operates to support the lower end of a plurality of generally cylindrically shaped substantially identical rubber springs 84. Each of rubber springs 84 has a generally cylindrical central bore 86 extending therethrough which tubular member 28 extends. A similar annular flange member 86 secured to collar portion 24 of stud 22 overlies and supports the upper end of the plurality of rubber springs.

While various types of rubber springs may be utilized in this application, it is believed that a non-collapsing fabric reinforced type such as what is referred to as a Marshmallow type available from Firestone Rubber Company will provide satisfactory operation.

In order to facilitate relative movement of each of rubber springs 84 with respect to each other as well as tubular member 28 during axial movement of strut 10, a plurality of bearing elements are provided, a pair of substantially identical elements 88 being positioned between each of the spring members 84 and a pair of substantially identical elements 90 being positioned between the upper and lower support flanges 80 and 86 and rubber springs 84. Elements 88 each include a relatively short axially extending cylindrical flange portion 92 surrounding and slidably engaging tubular member 28 and having an annular flange portion 94 integrally formed therewith extending radially outwardly intermediate the ends thereof and between adjacent rubber springs 84. Upper and lower bearing elements 90 also each have a cylindrical flange portion 96 slidably engaging tubular member 28 and an integrally formed radially extending flange portion 98 extending between plate member and the rubber spring element. Preferably each of these bearing elements 88 and 90 will be fabricated from a suitable low friction, long wearing polymeric composition such as Rulon.

An annular cylindrical shaped axially elongated flange member 100 is secured to the outer periphery of lower support flange and extends upwardly therefrom being spaced radially outwardly from rubber springs 84. An annular spring seat member 102 is secured to the upper end of cylindrical flange portion 100 and operates to support one end of a helical coil spring 104. The other end of coil spring 104 is supported on a generally radially outwardly extending annular flange member 106 secured to the upper end of tubular member 74.

A resilient jounce cushion 108 is provided secured to the lower surface of flange portion 80 which cushion is engageable with flange portion 106. Jounce cushion 108 will operate to limit the maximum compression of coil spring 104 so as to prevent spring 104 from going solid which could result in premature failure thereof. It should be noted that when flange portion 106 engages jounce cushion 108, they will operate to effectively remove coil spring 104 from the strut circuit and transfer any further loading directly to rubber springs 84.

In order to dampen shock loading exerted on the strut assembly 10 as a result of road surface imperfections encountered by the vehicle wheel, a friction damping assembly 108 is provided positioned within tubular member 74. Friction damping assembly includes a lower coil spring 110 positioned substantially coaxially within tubular member 74 and surrounding tubular member 36 and having one end positioned in a polymeric composition spring seat 112 engaging end flange 68. The opposite end of coil spring 110 is seated within an annular groove 114 provided in a lower annular wedge support member 116 also positioned in coaxial relationship with tubular members 74 and 36. An upper annular wedge support member 118 is also provided having an annular recess 120 provided therein within which the lower end of tubular member 78 is seated. Both upper and lower wedge support members 116 and 118 are provided with opposed conical surfaces 122 and 124 each of which engages complimentary shaped surfaces provided on opposite ends of a plurality of substantially identical damper shoes 128 positioned in circumferentially spaced relationship therebetween. As shown in FIG. 2, the upper and lower conical surfaces of the damper shoes and hence the corresponding surfaces 122 a 124 define non-parallel conical planes, surface 124 of which lies in a plane forming a smaller included angle relative to the longitudinal axis than the conical plane defined by surface 122. Also, the radially outer surface 132 of each of the damper shoes 128 is convex shaped so as to provide a substantially maximum surface area of engagement with the sidewall of tubular member 74 so as to create the desired frictional drag.

As previously mentioned, stud 22 is adapted to be secured to strut mounting provisions 20 associated with the vehicle body whereas lower tubular member will be fixedly secured to a vehicle wheel carrying axle assembly such as a steering knuckle 14 for example. Thus, in operation, when the vehicle wheel encounters an irregularity in the roadway, the force generated thereby will impart a vertically directed acceleration force on the tire 16 which will be transmitted through the axle assembly or steering knuckle 14 to the lower tubular member 74 secured thereto. Assuming the irregularity to be in the form of an upwardly projecting obstruction in the roadway so as to produce an upwardly vertically directed force which will then operate to compress strut assembly 10 by exerting a compressive loading on coil springs 110 and 104 and on rubber springs 84. As shown in the schematic diagram of FIG. 4 wherein the schematically represented spring elements of the system have been indicated by the same reference numbers used to refer to the spring elements shown in FIG. 2, rubber springs 84 are connected in series with coil springs 104 and 110 which in turn are connected in parallel with each other. Thus, substantially the full compressive loading will be exerted on rubber springs 84 whereas it will be split between coil springs 104 and 110. This compressive loading will effect an overall shortening of the axial length of strut 10 due to the upward telescopic movement of tubular member 36 into tubular member 28 and the relative downward telescopic movement of tubular member 28 and guide rod 34 into tubular members 78 and 36 respectively.

As mentioned above, coil spring 110 will operate to exert a compressive loading on lowered wedge support member 116 which loading will be opposed by the relative downward telescopic movement of tubular member 78 acting on the upper wedge support 118. Because of the relative difference in angulation of the surfaces 122 and 124 of upper and lower wedge supports 118 and 116 with the damping shoes 128, the forces acting thereon will operate to urge the radially outer sidewall surfaces of damping shoes 128 into engagement with the outer sidewall of tubular member 74 thereby creating a friction drag opposing the overall relative compressive movement of the strut. It should be noted that the amount of damping and hence the stiffness of strut 10 may be controlled by varying the angulation of surfaces 122 and 124 which in turn will control the resolution of compressive forces encountered by the strut and hence the forces urging the damping shoes 128 into engagement with tubular member 74. Thus, while coil springs 104 and 110 and rubber springs 84 will operate to absorb the forces exerting the compressive loading on strut 10, damping assembly 108 will operate to resist or damp the relative movement of the tubular members so as to limit sinusoi movement thereof. It should be noted that while as described above an increase in the compressive loading on strut 10 of sufficient magnitude will operate to actuate damping assembly 108 to produce a desired friction drag as strut 10 is compressed, the relative angulation of surfaces 122 and 124 and the corresponding coacting surfaces of damping shoes 128 will also operate to urge outer surfaces 132 into engagement with the inner sidewall of tubular member 74 during extending movement of strut 10 such as when rebounding from the initial upward vertical force or should the wheel encounter a depression in the roadway. Thus, a desired frictional damping will be produced during both compression and extension of strut 10. Additionally, because as shown in FIG. 2, damping shoes 128 engage the inner sidewall of tubular member 74, the outer wall of which is exposed to the environment, heat generated during operation thereof will be readily dissipated.

Additionally, as previously mentioned, jounce and rebound pads 109 and 54 respectively are also provided being engageable with flange portion 106 and bearing retainer 58 respectively, rebound pad 54 being operative to limit extreme suspension travel whereas jounce pad 109 operates to protect coil spring 104.

It should be noted that because rubber springs 84 inherently have a variable rate and thus operate to provide decreasing incremental deflection in response to increasing load as illustrated in the graph of FIG. 5, it is possible for the strut assembly of the present invention to provide improved ride frequency at both lightly loaded and fully loaded vehicle conditions. The plot of deflection versus load for rubber springs shown in FIG. 5 is to be considered exemplary only as it is possible to substantially alter the characteristics of this curve by controlling both geometry and materials used in fabrication of the rubber springs. Additionally, because the present invention utilizes friction damping in lieu of the hydraulic damping of prior struts which require rather complicated porting and valving arrangement substantially less high tolerance machining is required and hence the strut assembly of the present invention is substantially less costly to manufacture. Further, the elimination of the numerous seals required for hydraulic type damping offers both improved reliability and longevity. It should also be noted that because the strut of the present invention utilizes a substantial number of parts which may be easily fabricated by injection molding or the like, the need for performing costly machining operations is even further reduced over that required for other presently available strut assemblies.

Encountering of relatively small irregularities in the roadway may result in an insufficient force to overcome the static coefficient of friction of the engagement between damping shoes 128 and tubular member 74 in which case tubular members 74 and 78 will remain in a fixed position relative to each other and the forces will be transmitted therethrough to rubber springs 84. Thus, rubber springs 84 will operate to absorb these lower magnitude forces so as to insulate the vehicle body therefrom and the inherent self-damping characteristics thereof will operate to prevent excessive oscillation from occurring as a result thereof.

Referring now to FIG. 6, there is illustrated another embodiment of the present invention indicated generally at 134. Like numbers primed have been used to identify componets of strut 134 which are substantially identical to the corresponding components illustrated and described with reference to FIGS. 1 through 3 above and further description thereof has been omitted as being unnecessarily redundant.

In this embodiment, elongated hollow tubular member 28' is of a length substantially longer than tubular member 28 of strut 10 and is telescopically received within the lower tubular member 74'. A bearing 136 preferably of a suitable polymeric composition such as Rulon is fitted to tubular member 28' adjacent the lower end thereof which slidingly engages the inner sidewall of the lower tubular member 74'. A threaded plug member 138 having an opening 140 extending therethrough is also fitted within the lower end of tubular member 28' which cooperates with a suitable rubber rebound pad 142 fitted to the upper end of a rebound rod 144 extending through opening 140 by means of a threaded fastener 146 to limit maximum extension of strut 134. The lower end 148 of rebound rod 144 is threaded into a second plug member 150 which is in turn threaded into the lower end 72' of the lower tubular member 74'. Plug 150 has a suitable jounce pad 152 fitted to the upper surface thereof which is also adapted to engage plug member 138. In this embodiment jounce pad 152 will operate to limit maximum compression of strut 134.

A generally cylindrically shaped depending flange member 154 is secured to the lower surface of radially extending flange 106' and is positioned in substantially concentric coaxial relationship with tubular member 28'. A plurality of reinforcing flanges 156 are also provided extending between the outer sidewall thereof and lower surface 158 of flange 106'. A generally radially outwardly extending flange portion 160 is secured to the upper end of the lower tubular member being of a diameter only slightly less than the inside diameter of cylindrical flange portion 154 and adapted to be movable thereinto.

An annular lower wedge support member 162 is supported on flange portion 154 and includes an upper conical surface 164 and a concave radially inwardly facing surface 166. A suitable bearing member 168 is fitted within an annular groove provided on concave surface 166 and slidingly engages the outer sidewall of tubular member 28' extending therethrough.

An annular upper wedge support member 168 is also provided seated against surface 158 of radially extending flange portion 106' and also has a concave radially inwardly facing surface 170 provided with an annular groove within which a suitable bearing member 172 is positioned which also engages the outer sidewall of tubular member 28'. Preferably both the outer sidewall surface of tubular member 28' and the inner sidewall surface of tubular member 74' will be suitably polished to prevent excessive wear of bearing members 136, 168 and 172.

A plurality of circumferentially spaced damping shoes 174 are positioned between upper and lower wedge supports and have a radially inwardly facing concave surface 176 adapted to be urged into engagement with outer sidewall of the tubular member 28' in response to increasing and decreasing compressive loading between upper and lower wedge support members resulting from wheel originating vertical loading on strut 134.

As illustrated schematically in FIG. 7, in this embodiment the coil spring, the rubber springs and the friction damping assembly are all arranged in series relationship. Thus, the rubber spring and coil spring each experience the same loading which loading will also operate to create a friction drag opposing relative movement of tubular members 28' and 74'.

Strut 134 offers similar advantages over conventional struts employing hydraulic damping and substantially constant or fixed rate coil springs as mentioned above with regard to strut 10. Further, strut 134 offers a simplified design over the embodiment of FIGS. 1-3 requiring fabrication and assembly of substantially fewer parts.

Referring now to FIG. 8 of the drawings, there is illustrated yet another embodiment of the present invention indicated generally at 178. Strut 178 is substantially identical to the embodiment described with reference to FIGS. 6 and 7 except for the arrangement of the jounce and rebound stops. Accordingly, like portions have been indicated by like numbers double primed.

In this embodiment the lower hollow tubular member 74" is of substantially greater diameter than the upper tubular member 28" which extends concentrically thereinto. Accordingly, an enlarged annular bearing support member 180 is provided being seated on an undercut end portion of tubular member 28" and retained therein in a suitable manner such as by means of a split snap ring 182. A groove 184 is provided in the outer surface of bearing support member 180 within which a suitable bearing 186 preferably of a polymeric composition such as Rulon is seated which slidingly engages the inner sidewall of tubular member 74".

The upper end of tubular member 74" has a radially inwardly extending flange member 188 secured thereto which is provided with a suitable opening 190 through which tubular member 28" projects. A resilient rebound pad 192, preferably of rubber, is secured to the lower surface of flange portion 188 and adapted to engage the axially upwardly facing surface 194 of bearing support member 180 so as to limit maximum extension of strut 178. In order to limit maximum compression of coil spring 104" a resilient jounce pad 196 is provided secured to the lower surface 198 of flange portion 80" and is engageable with lower flange portion 106". Operation of jounce pad 196 is substantially the same as that described above with respect to jounce pad 109.

In order to protect the polished exterior sidewall surface of tubular member 28", a flexible rubber or polymeric dust boot member 200 is provided extending between and secured to upper and lower flange portions respectively. A similar dust boot may also be fitted in like manner to the embodiment of FIG. 6. Additionally, a suitable disc member 202 is also provided secured within the lower end of tubular member so as to close off the interior thereof and prevent entry of dirt or other contaminants.

The embodiment of FIG. 8 thus provides an even further simplification of the strut design of the present invention and further reduces the number of parts required for assembly thereof by providing a modified jounce and rebound stop. The operation of strut 178 is substantially the same as that described above with regard to strut 134.

It should also be noted that the strut of the present invention has been designed to provide a direct replacement for other types of struts. The present invention thus offers a substantially less costly alternative to conventional hydraulically dampened struts as well as additional advantages in that it is possible to more closely approximate the optimum vehicle ride frequency over the entire range of vehicle loading due to the use of rubber springs having an inherent variable rate.

While it will be apparent that the preferred embodiments of the invention disclosed are well calculated to provide the advantages, and features above stated, it will be appreciated that the invention is susceptible to modification, variation and change without departing from the proper scope or fair meaning of the subjoined claims.

I claim:

1. An improved strut for use in a suspension system of a motor vehicle comprising:

a plurality of rubber spring members positioned in a stacked relationship;

a first elongated tubular member extending through said stack of rubber spring members and having support means engaging one end of said stacked rubber spring members;

a second elongated tubular member disposed in substantially coaxial relationship with said first tubular member and being telescopically movable with respect thereto;

friction damping means; and actuating means operative to urge said friction damping means into engagement with one of said first and second tubular members in response to an axially directed loading on said strut whereby said damping means may operate to create a friction drag resisting telescopic movement of said first and second tubular members, said rubber spring members being operative to resiliently support a portion of said motor vehicle to provide a desired ride frequency over substantially the full vehicle load range said actuating means comprising first and second relatively movable annular members surrounding one of said first and second tubular members and said damping means comprising a plurality of damping shoes moveably positioned between said first and second relatively movable members, compressive loading on said strut being operative to urge said first and second relatively movable members in a converging direction whereby said damping shoes are urged into engagement with said one of said first and second tubular members; and a third elongated tubular member positioned in telescopic substantially coaxial relationship with said first and second tubular members, one of said first and second relatively movable members engaging one end of said third elongated tubular member and the other end of said third elongated tubular member engaging the other end of said rubber spring members.

2. A strut as set forth in claim 1 wherein the other of said first and second relatively movable member is operatively connected to one end of said second tubular member.

3. A strut as set forth in claim 2 further comprising a coil spring, one end of said coil spring engaging said other of said first and second relatively movable members and the other end supported by an annular flange portion secured to said one end of said second tubular member.

4. A strut as set forth in claim 3 further comprising a second coil spring positioned is substantially coaxial relationship with said stacked rubber spring members and means for connecting said second coil spring in series with said stacked rubber spring members between said first and second tubular members.

5. A strut as set forth in claim 4 wherein said connecting means comprise a fourth tubular member disposed in substantially coaxial relationship with said first and second tubular members and having one end connected to said one end of said second tubular member, and a radially extending flange member secured to the other end of said fourth tubular member, said flange member supportingly engaging one end of said second coil spring.

6. A strut as set forth in claim 5 wherein said first and second relatively movable members and said damping shoes are movably positioned between said second and fourth tubular members.

7. A strut as set forth in claim 6 further comprising second flange means engaging the other end of said stacked rubber spring members and movably surrounding said first tubular member, and coil spring support means secured to said second flange portion, said coil spring support means supportingly engaging the other end of said second coil spring.

8. A strut as set forth in claim 7 further comprising a jounce pad secured to said second flange portion and engageable with said radially extending flange member so as to limit maximum compressive movement of said second coil spring.

9. A strut as set forth in claim 1 further comprising bearing means secured to the other end of said second tubular member and engageable with the inner sidewall surface of said first tubular member so as to guide telescopic movement therebetween.

10. A strut as set forth in claim 9 further comprising second bearing means secured to one end of said first tubular member and engageable with the outer sidewall surface of said second tubular member so as to guide telescopic movement therebetween, said second bearing means including a resilient rebound pad secured to an axially facing surface thereof and engageable with said first bearing means so as to limit maximum extension of said strut.

11. A strut as set forth in claim 1 wherein said actuating means comprises first and second relatively movable annular members surrounding one of said first and second tubular members and said damping means comprises a plurality of damping shoes movably positioned between said first and second relatively movable members, compressive loading on said strut being operative to urge said first and second relatively movable members in a converging direction to move said damping shoes into engagement with said first and second tubular members and wherein said strut further comprises a generally radially extending flange portion secured to one end of said second tubular member, one of said first and second relatively movable members being supported on said radially extending flange portion.

12. A strut as set forth in claim 11 further comprising a generally cylindrically shaped elongated member surrounding said first tubular member, said first and second relatively movable members being positioned within said cylindrical member.

13. A strut as set forth in claim 11 further comprising means resiliently supporting said cylindrical member on the other end of said stacked rubber spring members.

14. A strut as set forth in claim 13 wherein said cylindrical member has a radially extending flange secured to one end thereof, said flange supporting the other of said first and second relatively movable members and said resilient supporting means.

15. A strut as set forth in claim 14 wherein the other end of said cylindrical member is open and is adapted to telescopically receive said one end of said second tubular member.

16. A strut as set forth in claim 15 wherein said resilient supporting means includes a coil spring having one end engaging said flange secured to one end of said cylindrical member.

17. A strut as set forth in claim 14 wherein said first and second relatively movable members are operative to urge each of said damping shoes into engagement with an outer sidewall surface of said first tubular member in response to compressive forces exerted between said first and second tubular members.

18. A strut as set forth in claim 14 further comprising resilient jounce means for limiting maximum compressive movement of said first and second tubular members and resilient rebound means for limiting maximum extension of said first and second tubular members.

19. A strut as set forth in claim 18 wherein said jounce means comprise an end plug secured within the other end of said second tubular member and a resilient pad secured to said plug, said pad being engageable with one end of said first tubular member.

20. A strut as set forth in claim 19 wherein said rebound means comprise an elongated rod member having one end secured to said plug member and extending generally coaxially into said first tubular member, a rebound pad secured to the other end of said rod member, a second plug secured to said one end of said first tubular member, said rebound pad being engageable with said second plug.

21. A strut as set forth in claim 18 wherein said jounce means comprise a jounce pad means engaging one end of said stacked rubber springs and engageable with said flange secured to said one end of said cylindrical member.

22. A strut as set forth in claim 18 wherein said rebound means comprise a bearing member secured to one end of said first tubular member and engaging the inner sidewall of said second tubular member and a rebound pad secured to said radially extending flange secured to said one end of said second tubular member, said rebound pad being engageable with said bearing member.

23. An improved strut for use in a motor vehicle suspension system comprising:
   a first elongated tubular member having means for securing one end thereof to a portion of a motor vehicle to be supported by said suspension system;
   a plurality of stacked rubber spring members each having a bore extending therethrough and being arranged with said bores in substantially coaxial relationship, said first tubular member extending through said bores;
   support means secured to one end of said first tubular member for supporting one end of said stacked rubber spring members;
   a first coil spring positioned coaxially with said rubber spring members;
   a second tubular member movably positioned in telescopic relationship with said first tubular member and having one end secured to a road engaging portion of said motor vehicle;
   coil spring support means secured to said second tubular member and supportingly engaging one end of said coil spring;
   means interconnecting the other end of said coil spring with the other end of said stacked rubber spring members to interconnect said coil spring and said rubber spring members in series relationship;
   friction damping means positioned between said first and second tubular members and operative in response to relative movement thereof to exert a friction drag therebetween, said friction damping means comprising first and second axially spaced relatively movable annular members surrounding one of said first and second tubular members and a plurality of circumferentially spaced damping shoes positioned therebetween, said damping shoes being urged into engagement with said other of said first and second tubular members by said first and second relatively movable members in response to compressive loading on said strut; and
   a third tubular member extending between one of said first and second relatively movable members and the other end of said stacked rubber spring members, and a second coil spring resiliently supporting the other of said first and second relatively movable members on the other end of said second tubular member.

24. An improved strut for use in a suspension system of a motor vehicle comprising:
   a plurality of rubber spring members positioned in a stacked relationship;
   a first elongated tubular member extending through said stack of rubber spring members and having support means secured to one end thereof for supporting one end of said rubber spring members;
   a helical coil spring positioned coaxially with and in part surrounding said rubber spring members;
   support means extending between the other end of said stack of rubber spring members and supportingly engaging one end of said coil spring;
   a second tubular member positioned coaxially with said first tubular member and adapted to telescopically receive said first tubular member;
   a radially extending annular flange portion secured to one end of said second tubular member and supportingly engaging the other end of said coil spring;
   a third elongated tubular member having one end secured to the other end of said second tubular member and extending in substantially coaxial telescopic relationship into said first tubular member;
   friction damping means positioned between said second and third tubular members and including damping shoe means engageable with the inner sidewall surface of said second tubular member; and
   means interconnecting the other end of said stack of rubber spring members with one end of said friction damping means and resilient means interconnecting the other end of said second tubular member with the other end of said friction damping means whereby axial movement of said strut will operate to urge said damping shoe means into engagement with said inner sidewall surface so as to dampen relative movement between said first tubular member and said second and third tubular members.

* * * * *